United States Patent
Chen et al.

(10) Patent No.: US 12,431,556 B2
(45) Date of Patent: Sep. 30, 2025

(54) HEATING METHOD AND HEATING SYSTEM OF TRACTION BATTERY

(71) Applicant: CONTEMPORARY AMPEREX TECHNOLOGY (HONG KONG) LIMITED, Hong Kong (CN)

(72) Inventors: Xinwei Chen, Ningde (CN); Zhimin Dan, Ningde (CN); Chengyong Liu, Ningde (CN); Wei Zhang, Ningde (CN); Yu Yan, Ningde (CN); Xian Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 229 days.

(21) Appl. No.: 18/453,056

(22) Filed: Aug. 21, 2023

(65) Prior Publication Data
US 2023/0395899 A1    Dec. 7, 2023

Related U.S. Application Data

(63) Continuation of application No. PCT/CN2021/127572, filed on Oct. 29, 2021.

(51) Int. Cl.
*H01M 10/615* (2014.01)
*H01M 10/42* (2006.01)
(Continued)

(52) U.S. Cl.
CPC ..... *H01M 10/615* (2015.04); *H01M 10/4264* (2013.01); *H01M 10/48* (2013.01);
(Continued)

(58) Field of Classification Search
None
See application file for complete search history.

(56) References Cited

U.S. PATENT DOCUMENTS

| | | | | |
|---|---|---|---|---|
| 2021/0075073 A1* | 3/2021 | Hou | ............... | H02J 7/007194 |
| 2021/0354592 A1* | 11/2021 | Zuo | ............... | H01M 10/615 |

FOREIGN PATENT DOCUMENTS

| | | | |
|---|---|---|---|
| CN | 110962692 A | 4/2020 | |
| CN | 110970672 A | 4/2020 | |
| (Continued) | | | |

OTHER PUBLICATIONS

The European Patent Office (EPO) the Extended European Search Report for Application No. 21961908.7 Jan. 24, 2025 9 Pages.

(Continued)

*Primary Examiner* — Scott J. Chmielecki
(74) *Attorney, Agent, or Firm* — ANOVA LAW GROUP, PLLC

(57) ABSTRACT

A heating method traction battery. The traction battery is connected to a switch circuit of a motor and configured to supply power to the motor via the switch circuit. The switch circuit includes multiple legs and the multiple legs are connected to the traction battery in parallel. The method includes: receiving a heating signal sent by a battery management system of the traction battery; and controlling, according to the heating signal, at least one of the multiple legs to form a short-circuit loop of the traction battery, the short-circuit loop being configured to discharge the traction battery and heat the traction battery during the discharging process.

18 Claims, 12 Drawing Sheets

(51) Int. Cl.
  *H01M 10/48* (2006.01)
  *H01M 10/625* (2014.01)
  *H01M 10/657* (2014.01)
  *H02J 7/00* (2006.01)

(52) U.S. Cl.
  CPC ....... *H01M 10/625* (2015.04); *H01M 10/657* (2015.04); *H02J 7/0047* (2013.01); *H02J 7/0063* (2013.01); *H01M 2010/4271* (2013.01); *H01M 2220/20* (2013.01)

(56) References Cited

FOREIGN PATENT DOCUMENTS

| | | |
|---|---|---|
| CN | 111048856 A | 4/2020 |
| CN | 111347936 A | 6/2020 |
| CN | 112731984 A | 4/2021 |
| CN | 113002366 A | 6/2021 |
| CN | 113752908 A | 12/2021 |
| JP | 2004063397 A | 2/2004 |
| JP | 2013187040 A | 9/2013 |
| JP | 2015037013 A | 2/2015 |
| JP | 5741494 B2 | 7/2015 |
| JP | 2021002992 A | 1/2021 |
| WO | 2013174282 A1 | 11/2013 |

OTHER PUBLICATIONS

The World Intellectual Property Organization (WIPO) International Search Report and Written Opinion for PCT/CN2021/127572 May 23, 2022 15 pages (with translation).
The European Patent Office (EPO) the Extended European Search Report for Application No. 21961908.7 Jan. 24, 2024 9 Pages.
The Japan Patent Office (JPO) Notice of Reasons for Refusal for Application No. 2024-501899 Dec. 16, 2024 10 Pages (including translation).
The Japan Patent Office (JPO) Decision to Grant a Patent for Application No. 2024-501899 Apr. 30, 2025 6 Pages (including translation).
The Japan Patent Office (JPO) Notice of Reasons for Refusal for Application No. 2024-501899 Dec. 16, 2024 9 Pages (including translation).
State Intellectual Property Office of China The First Office Action for Application No. 202180055390.0 Aug. 15, 2025 17 pages (including translation).

* cited by examiner

HEATING METHOD AND HEATING SYSTEM OF TRACTION BATTERY

CROSS-REFERENCE TO RELATED APPLICATION

This application is a continuation of International Application No. PCT/CN2021/127572, filed on Oct. 29, 2021, the entire content of which is incorporated herein by reference.

TECHNICAL FIELD

This application relates to the field of battery technologies, and in particular, to a heating method and heating system of traction battery.

BACKGROUND

With the advantages such as high energy density, support of cyclic charging, safety, and environment friendliness, traction batteries are widely used in new energy vehicles, consumer electronics, energy storage systems, and other fields.

However, in low-temperature environments, use of traction batteries is limited. Specifically, in low-temperature environments, discharge capacity of traction batteries severely degrades, and the traction batteries cannot be charged. Therefore, to ensure the normal use of traction batteries, it is needed to heat them up in low-temperature environments. How traction batteries are effectively heated has become a problem to be resolved urgently.

SUMMARY

Embodiments of this application provide a heating method and heating system of traction battery, which can effectively heat traction batteries.

According to a first aspect, a heating method of traction battery is provided. The traction battery is connected to a switch circuit of a motor and configured to supply power to the motor via the switch circuit. The switch circuit includes multiple legs and the multiple legs are connected to the traction battery in parallel. The method includes: receiving a heating signal sent by a battery management system of the traction battery; and controlling, according to the heating signal, at least one of the multiple legs to form a short-circuit loop of the traction battery, the short-circuit loop being configured to discharge the traction battery and heat the traction battery during the discharging process.

In this embodiment, formation of the short-circuit loop of the traction battery allows the traction battery to discharge via the short-circuit loop, thus implementing heating of the traction battery during discharging of the traction battery. Because the short-circuit loop is formed by utilizing the switch circuit of the motor, it is unnecessary to add an extra heating apparatus, and the traction battery can be heated with low costs.

In a possible implementation, the method further includes: obtaining current passing through the traction battery and/or voltage of the traction battery; determining a on duty cycle of the short-circuit loop based on the current passing through the traction battery and/or voltage of the traction battery; and controlling, based on the on duty cycle, the short-circuit loop to turn on, such that the current in the short-circuit loop does not exceed allowable discharge current of the traction battery, and/or the voltage of the traction battery is not lower than minimum discharge voltage of the traction battery.

In this embodiment, the current and/or voltage in the short-circuit loop is controlled within a safety threshold by controlling the on duty cycle of the short-circuit loop, thus preventing the current of the traction battery from exceeding its allowable discharge current, and/or preventing the voltage of the traction battery from exceeding its minimum discharge voltage during heating. This avoids damage to the traction battery during heating and ensures the safety during the heating.

In a possible implementation, obtaining current in the short-circuit loop includes: detecting the current in the short-circuit loop via a current sensor disposed in the short-circuit loop; and/or determining the current in the short-circuit loop based on the voltage of the traction battery and internal resistance of the traction battery.

In this embodiment, to monitor the current in the short-circuit loop, the current sensor may be disposed in the short-circuit loop to detect the current more intuitively and accurately; or the current in the short-circuit loop may be determined based on the voltage of the traction battery and the internal resistance of the traction battery, thus reducing the devices in the short-circuit loop to reduce the costs and complexity. The internal resistance of the traction battery is internal resistance of the traction battery under a current temperature and can be calculated through a relationship curve between internal resistance and temperature.

In a possible implementation, the controlling, based on the on duty cycle, the short-circuit loop to turn on includes: controlling, based on the on duty cycle, the at least one leg to turn on.

In this embodiment, based on the on duty cycle, each leg in the switch circuit of the motor can be controlled to turn on, thus forming the short-circuit loop. This can be achieved without adding extra devices, thus avoiding extra costs.

In a possible implementation, a second switch is disposed between the traction battery and the at least one leg, and the controlling, based on the on duty cycle, the short-circuit loop to turn on includes: controlling, based on the on duty cycle, the second switch to turn on.

In this embodiment, based on the on duty cycle, the extra second switch can be controlled to turn on, thus forming the short-circuit loop. This reduces the complexity of the control process.

In a possible implementation, the method further includes: obtaining the internal resistance of the traction battery; determining an on frequency of the short-circuit loop based on the internal resistance of the traction battery, where a smaller internal resistance of the traction battery leads to a higher on frequency; and controlling, based on the on frequency, the short-circuit loop to turn on.

In this embodiment, because a smaller internal resistance of the traction battery leads to a faster increase of current in the short-circuit loop, a higher on frequency is needed to control the increase of the current, thus ensuring the safety during heating and avoiding damage to the traction battery during heating.

In a possible implementation, the traction battery is further connected to a capacitor branch in parallel, the capacitor branch includes a capacitor and a first switch connected in series, and the method further includes: before controlling the short-circuit loop to turn on, controlling the first switch to turn off.

In this embodiment, the first switch is disposed in a branch on which a voltage regulator capacitor connected to the traction battery in parallel is located, and the first switch is controlled to turn off during heating. This can prevent the voltage regulator capacitor of the traction battery from affecting the heating of the traction battery, thus improving heating efficiency.

In a possible implementation, each of the at least one leg includes a first switching device and a second switching device connected in series, and a joint between the first switching device and second switching device of each of the at least one leg is connected to at least one winding of the motor in one-to-one correspondence.

In a possible implementation, the method further includes: receiving a heating stop signal sent by the battery management system; and controlling, according to the heating stop signal, the short-circuit loop to turn off, so as to stop heating the traction battery.

In a possible implementation, the traction battery is a solid-state battery, and/or the internal resistance of the traction battery is greater than a preset value.

In this embodiment, because a smaller internal resistance of the traction battery leads to a faster increase of current in the short-circuit loop, a higher on frequency is needed to control the increase of the current. This imposes high requirements on the switching devices. Therefore, the method of using the short-circuit loop to heat the traction battery is more suitable for solid-state batteries or traction batteries with large internal resistance, thus reducing the requirements on the switching devices.

According to a second aspect, a heating system of traction battery is provided, including: a traction battery; a switch circuit disposed between the traction battery and a motor and configured for the traction battery to supply power to the motor, where the switch circuit includes multiple legs, and the multiple legs are connected to the traction battery in parallel; and a control circuit configured to receive a heating signal sent by a battery management system of the traction battery, and control, according to the heating signal, at least one of the multiple legs to form a short-circuit loop of the traction battery, the short-circuit loop being configured to discharge the traction battery and heat the traction battery during the discharging process.

In a possible implementation, the control circuit is further configured to: obtain current passing through the traction battery and/or voltage of the traction battery; determine an on duty cycle of the short-circuit loop based on the current passing through the traction battery and/or the voltage of the traction battery; and control, based on the on duty cycle, the short-circuit loop to turn on, such that the current in the short-circuit loop does not exceed allowable discharge current of the traction battery, and/or the voltage of the traction battery is not lower than minimum discharge voltage of the traction battery.

In a possible implementation, the control circuit is specifically configured to detect the current in the short-circuit loop via a current sensor disposed in the short-circuit loop; and/or determine the current in the short-circuit loop based on the voltage of the traction battery and internal resistance of the traction battery.

In a possible implementation, the control circuit is specifically configured to control, based on the on duty cycle, the at least one leg to turn on.

In a possible implementation, a second switch is disposed between the traction battery and the at least one leg, and the control circuit is specifically configured to control, based on the on duty cycle, the second switch to turn on.

In a possible implementation, the control circuit is further configured to: obtain the internal resistance of the traction battery; determine an on frequency of the short-circuit loop based on the internal resistance of the traction battery, where a smaller internal resistance of the traction battery leads to a higher on frequency; and control, based on the on frequency, the short-circuit loop to turn on.

In a possible implementation, the switch circuit further includes a capacitor branch connected to the traction battery in parallel, the capacitor branch includes a capacitor and a first switch connected in series, and the control circuit is further configured to, before controlling the short-circuit loop to turn on, control the first switch to turn off.

In a possible implementation, each of the at least one leg includes a first switching device and a second switching device connected in series, and a joint between the first switching device and second switching device of each of the at least one leg is connected to at least one winding of the motor in one-to-one correspondence.

In a possible implementation, the control circuit is further configured to receive a heating stop signal sent by the battery management system; and control, according to the heating stop signal, the short-circuit loop to turn off, so as to stop heating the traction battery.

In a possible implementation, the traction battery is a solid-state battery, and/or the internal resistance of the traction battery is greater than a preset value.

Based on the foregoing technical solution, the short-circuit loop of the traction battery is formed by utilizing the switch circuit of the motor, such that the traction battery discharges via the short-circuit loop, thus heating the traction battery during discharging of the traction battery. Because it is unnecessary to add an extra heating apparatus, the traction battery can be heated with low costs.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

DESCRIPTION OF EMBODIMENTS

Figure 1:
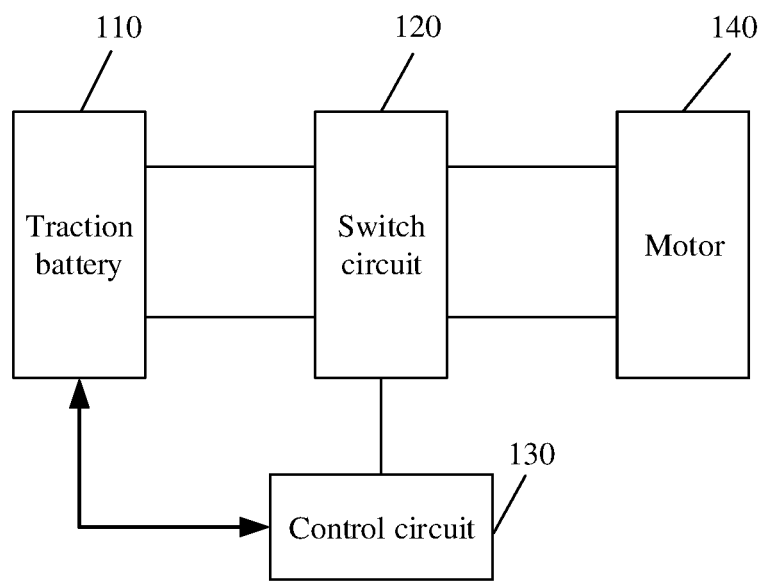
FIG. 1 is a schematic block diagram of a battery heating system disclosed in an embodiment of this application.

The following further describes implementations of this application in detail with reference to the accompanying drawings and embodiments. The following detailed description of embodiments and the accompanying drawings are intended to illustrate the principle of this application rather than to limit the scope of this application, meaning this application is not limited to the embodiments as described.

In the descriptions of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not strictly vertical, but within the allowable range of error. "Parallel" is not strictly parallel, but within the allowable range of error.

The orientation terms appearing in the following description all are directions shown in the figures, and do not limit the specific structure of the application. In the descriptions of this application, it should be further noted that unless otherwise specified and defined explicitly, the terms "installation", "link", and "connection" should be understood in their general senses. For example, the terms may be a fixed connection, a detachable connection, or an integrated connection, or may be a direct connection, or an indirect connection through an intermediate medium. Persons of ordinary skill in the art can understand specific meanings of these terms in this application as appropriate to specific situations.

With the development of the times, new energy vehicles have a great market prospect thanks to their advantages such as environment friendliness, low noise, and low use costs, and can effectively promote energy conservation and emission reduction, conducive to the development and progress of society.

Due to the electrochemical characteristics of traction batteries, charging and discharging capacity of the traction batteries is greatly limited in low-temperature environments, which severely affects user experience of vehicles in winter. Therefore, for normal use of traction batteries, it is needed to heat them up in low-temperature environments.

For this, this application provides a heating solution in which a short-circuit loop of a traction battery is formed to heat the internal resistor of the traction battery, thus quickly raising the temperature of the traction battery. Because the short-circuit loop is formed by utilizing the switch circuit of the motor, it is unnecessary to add an extra heating apparatus, and the traction battery can be heated with low costs.

The traction battery in the embodiments of this application may be a solid-state battery, a lithium-ion battery, a lithium metal battery, a lead-acid battery, a nickel-cadmium battery, a nickel-metal hydride battery, a lithium-sulfur battery, a lithium-air battery, a sodium-ion battery, or the like. This is not limited herein. In terms of scale, the traction battery in the embodiments of this application may be a battery cell, or may be a battery module or a battery pack. This is not limited herein. In terms of application scenarios, the traction battery can be used in power apparatuses such as an automobile and a ship. For example, the battery can be used in an electric vehicle to power a motor of the automobile as a power source for the electric vehicle. The traction battery can also power other electric devices in the electric vehicle, for example, powering a vehicular air conditioner, a vehicular player, and the like.

For ease of description, an example in which the traction battery is applied to a new energy vehicle (that is, a motor vehicle, or referred to as an electric vehicle) is used to describe the solution of this application.

FIG. 1 is a schematic diagram of a battery heating system 100 according to an embodiment of this application. As shown in FIG. 1, the battery heating system 100 includes a traction battery 110, a switch circuit 120, and a control circuit 130. The control circuit 130 is connected to the motor 140 to control the connection state of the motor 140. In addition, the control circuit 130 can exchange information with the traction battery 110, and specifically, with a battery management system (battery management system, BMS) of the traction battery 110. The switch circuit 120 is a switch circuit of a motor 140 or an inverter of the motor 140. The switch circuit 120 is disposed between the traction battery 110 and the motor 140. As shown in FIG. 1, the switch circuit 120 is connected between the traction battery 110 and the motor 140, and the traction battery 110 supplies power to the motor 140 via the switch circuit 120, so as to drive the vehicle to run.

The switch circuit 120 may include multiple legs and the multiple legs are connected to the traction battery 110 in parallel. For example, as shown in FIG. 2, the switch circuit 120 includes a leg 121, a leg 122, and a leg 123, and the leg 121, the leg 122, and the leg 123 are all connected to the traction battery 110 in parallel.

In an implementation, each of the at least one leg used for forming the short-circuit loop includes a first switching device and a second switching device connected in series, and a joint between the first switching device and second switching device of each of the at least one leg is connected to at least one winding of the motor 140 in one-to-one correspondence.

The number of the legs in the switch circuit 120 is equal to the number of the windings of the motor 140. It is assumed that the motor 140 includes three windings, the switch circuit 120 includes three legs, namely, the leg 121, the leg 122, and the leg 123. Each of the three legs includes an upper leg and a lower leg, and the upper leg and the lower leg are each provided with an IGBT switch.

Figure 2:
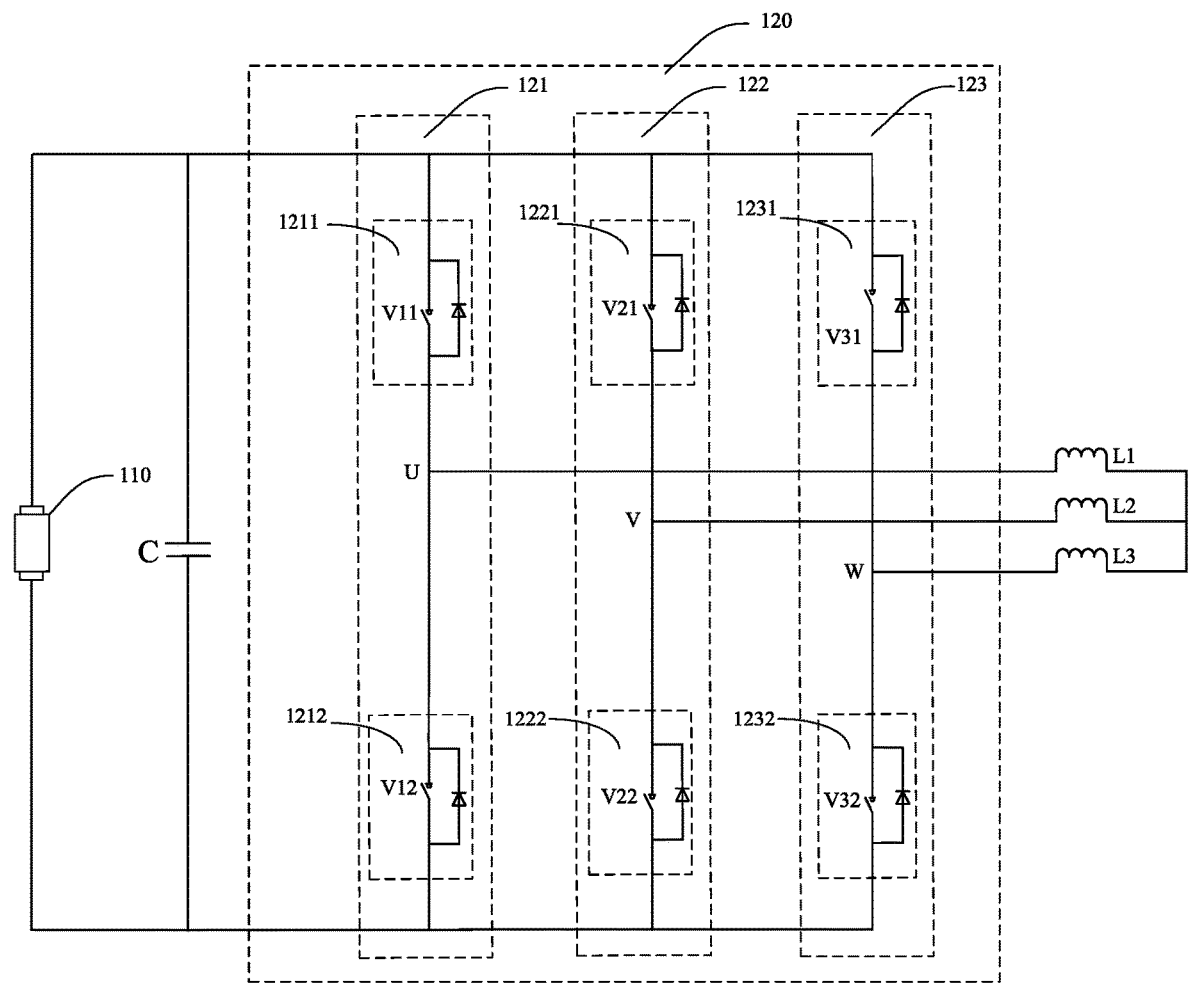
FIG. 2 is a schematic diagram of a circuit structure of the battery heating system shown in FIG. 1.

As shown in FIG. 2, the motor 140 may specifically include a winding L1 connected to the leg 121, a winding L2 connected to the leg 122, and a winding L3 connected to the leg 123. One end of the winding L1 is connected to a joint between an upper leg 1211 and a lower leg 1212 of the leg 121, one end of the winding L2 is connected to a joint between an upper leg 1221 and a lower leg 1222 of the leg 122, and one end of the winding L3 is connected to a joint between an upper leg 1231 and a lower leg 1232 of the leg 123. The other end of the winding L1, the other end of the winding L2, and the other end of the winding L3 are connected together.

In addition, the motor 140 includes but is not limited to three windings, and may include six windings or the like. Correspondingly, the switch circuit 120 may include six legs.

Each leg in the switch circuit 120 can be implemented using various types of switches. In an example, as shown in FIGS. 5 to 10, each leg is implemented based on an insulated gate bipolar transistor (insulated gate bipolar transistor, IGBT) switch.

Figure 3:
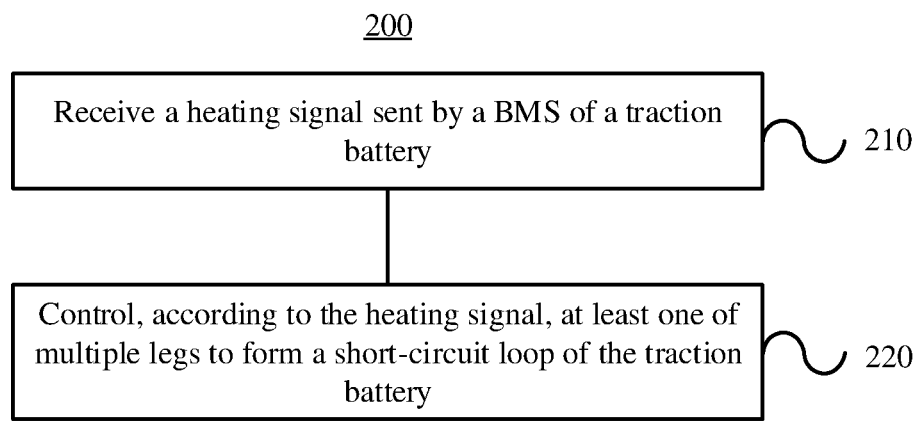
FIG. 3 is a schematic flowchart of a battery heating method disclosed in an embodiment of this application.

In an implementation, the control circuit 130 is configured to perform the method 200 shown in FIG. 3. As shown in FIG. 3, the method 200 includes some or all of the following steps.

Step 210: Receive a heating signal sent by a BMS of a traction battery 110.

Step 220: Control, according to the heating signal, at least one of multiple legs to form a short-circuit loop of the traction battery 110, the short-circuit loop being configured to discharge the traction battery 110 and heat the traction battery 110 during the discharging process.

Therefore, the formation of the short-circuit loop of the traction battery 110 allows the traction battery 110 to discharge via the short-circuit loop, thus heating the traction battery 110 during discharging of the traction battery 110. Because the short-circuit loop is formed by utilizing the switch circuit 120 of a motor 140, it is unnecessary to add an extra heating apparatus, and the traction battery 110 can be heated with low costs.

The BMS can determine, based on state parameters of the traction battery 110, such as SOC, voltage U, temperature T, and other information, whether to send the heating signal to the control circuit 130. The control circuit 130 may be a controller of the motor 140 and is configured to control the operation of the motor 140 to drive the vehicle or the like and control the heating of the traction battery 110. Alternatively, the control circuit 130 may be a control circuit disposed independent of the controller of the motor 140 and is configured to control the heating process of the traction battery 110.

The short-circuit loop of the traction battery 110 is the discharge loop of the traction battery 110. In this case, the positive and negative electrodes of the traction battery 110 are short-circuited. The traction battery 110 heats its internal resistor via the discharge loop, thus heating itself.

In an implementation, the method 200 may include some or all of the following steps:

Step 230: Obtain a current I passing through the traction battery 110 and/or a voltage U of the traction battery 110.

Step 240: Determine an on duty cycle of the short-circuit loop based on the current I passing through the traction battery 110 and/or the voltage U of the traction battery 110.

Step 250: Control, based on the on duty cycle, the short-circuit loop to turn on, such that the current I in the short-circuit loop does not exceed an allowable discharge current $I_A$ of the traction battery 110, and/or the voltage U of the traction battery 110 is not lower than a minimum discharge voltage $U_A$ of the traction battery.

When the control circuit 130 performs steps 230 to 250, the control circuit is turned on based on a specified on duty cycle, such that the current I and voltage U in the short-circuit loop are controlled within a safety threshold, thus preventing the current of the traction battery 110 from exceeding its allowable discharge current, and/or preventing the voltage of the traction battery 110 from exceeding its minimum discharge voltage. This avoids damage to the traction battery 110 during heating and ensures the safety during the heating.

Specifically, when the short-circuit loop of the traction battery 110 is formed, the current I in the short-circuit loop, that is, the discharge current I of the traction battery increases quickly. When the current I exceeds the allowable discharge current $I_A$ of the traction battery 110, the traction battery 110 may be damaged, thus causing safety problems. In view of this, it is needed to control the current I in the short-circuit loop not to exceed the allowable discharge current $I_A$ of the traction battery 110. In the case of controlling, based on a specified duty cycle, the short-circuit loop to turn on, the short-circuit loop is turned off before the current I in the short-circuit loop reaches the allowable discharge current $I_A$, for example, the short-circuit loop is turned off when the current I exceeds a first threshold, and then the short-circuit loop is turned on again when the current I drops to a specified level. In this way, the current I can be controlled not to exceed the allowable discharge current $I_A$ of the traction battery 110 during battery heating until the traction battery 110 is heated to a pre-determined temperature.

The first threshold is, for example, less than or equal to the allowable discharge current $I_A$ of the traction battery 110. Description is made below by using an example in which the first threshold is equal to the allowable discharge current $I_A$.

Figure 4:
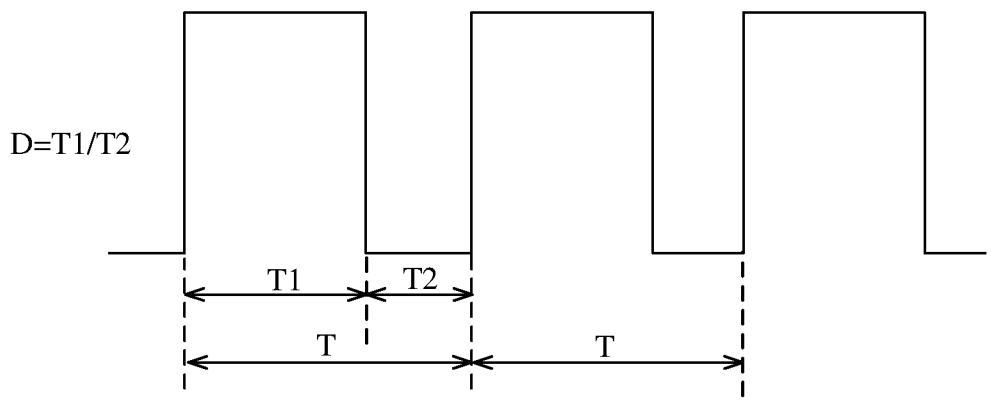
FIG. 4 is a schematic diagram of an on duty cycle of a short-circuit loop.

As shown in FIG. 4, during a heating cycle T, in a time period T1, the short-circuit loop needs to be turned on, so as to heat the traction battery 110; and in a time period T2, the short-circuit loop needs to be turned off, so as to prevent the current I in the short-circuit loop from exceeding the allowable discharge current $I_A$ of the traction battery 110, where the duty cycle D=T1/T2. Optionally, the duty cycle D can be determined based on the allowable discharge current $I_A$, the voltage U, the internal resistance R, and the like of the traction battery 110. For example, the initial duty cycle $D_{max}$ can be set as follows: $D_{max}=I_A/(U/R)$. The duty cycle $D_{max}$ may be a constant value, that is, remains unchanged during heating; or may be adjusted in real time.

The allowable discharge current $I_A$ of the traction battery 110 is related to the characteristics of the traction battery. If the allowable discharge current $I_A$ of the traction battery 110 is large, a large initial duty cycle $D_{max}$ may be set; otherwise, if the allowable discharge current $I_A$ of the traction battery 110 is small, a small initial duty cycle $D_{max}$ may be set.

During heating of the traction battery 110, because the traction battery 110 is discharging, the voltage U of the traction battery 110 changes. Generally, the voltage U should not be smaller than the minimum discharge voltage $U_A$ of the traction battery 110. Therefore, when the voltage U is about to be lower than the minimum discharge voltage $U_A$ of the traction battery 110, for example, when the voltage is less than a second threshold, the duty cycle D can be reduced appropriately, so as to reduce the valid value of the current I, thus stabilizing the voltage U above the minimum discharge voltage $U_A$.

The second threshold is, for example, greater than or equal to the minimum discharge voltage $U_A$ of the traction battery 110. Description is made below by using an example in which the second threshold is equal to the minimum discharge voltage $U_A$.

In an implementation, step 230 performed by the control circuit 130 may further include: detecting the current I in the short-circuit loop via a current sensor disposed in the short-circuit loop; and/or determining the current I in the short-circuit loop based on the voltage U of the traction battery 110 and the internal resistance R of the traction battery 110.

To monitor the current in the short-circuit loop, the current sensor can be disposed in the short-circuit loop to detect the current I more intuitively and accurately. For example, a current sensor may be cascaded between the battery and the switch circuit 120.

Alternatively, the current I in the short-circuit loop may be determined based on the voltage U of the traction battery 110 and the internal resistance R of the traction battery, which reduces the number of the devices in the short-circuit loop, thus reducing the costs and complexity. For example, the control circuit 130 can obtain information of the traction battery 110 such as the voltage U, internal resistance R, or temperature T from the BMS of the traction battery 110.

The internal resistance R of the traction battery 110 is the internal resistance R of the traction battery 110 under the current temperature T, and the internal resistance R can be determined according to a relationship curve between the internal resistance R and the temperature T. During heating, the change in temperature of the traction battery 110 causes a corresponding change in internal resistance R of the traction battery 110. Generally, as the temperature T of the traction battery 110 increases, the internal resistance R of the traction battery 110 decreases, which leads to the increase of the current I. The temperature T and the internal resistance R satisfy a specified relationship curve. The temperature T of the traction battery 110 can be detected using a temperature sensor. The internal resistance R corresponding to the current temperature T can be determined according to a rule between the temperature T and the internal resistance R, and then the current I in the short-circuit loop can be obtained according to I=U/R.

In an implementation, step 250 performed by the control circuit 130 may further include: controlling, based on the on duty cycle, at least one leg in the switch circuit 120 to turn on.

Figure 5:
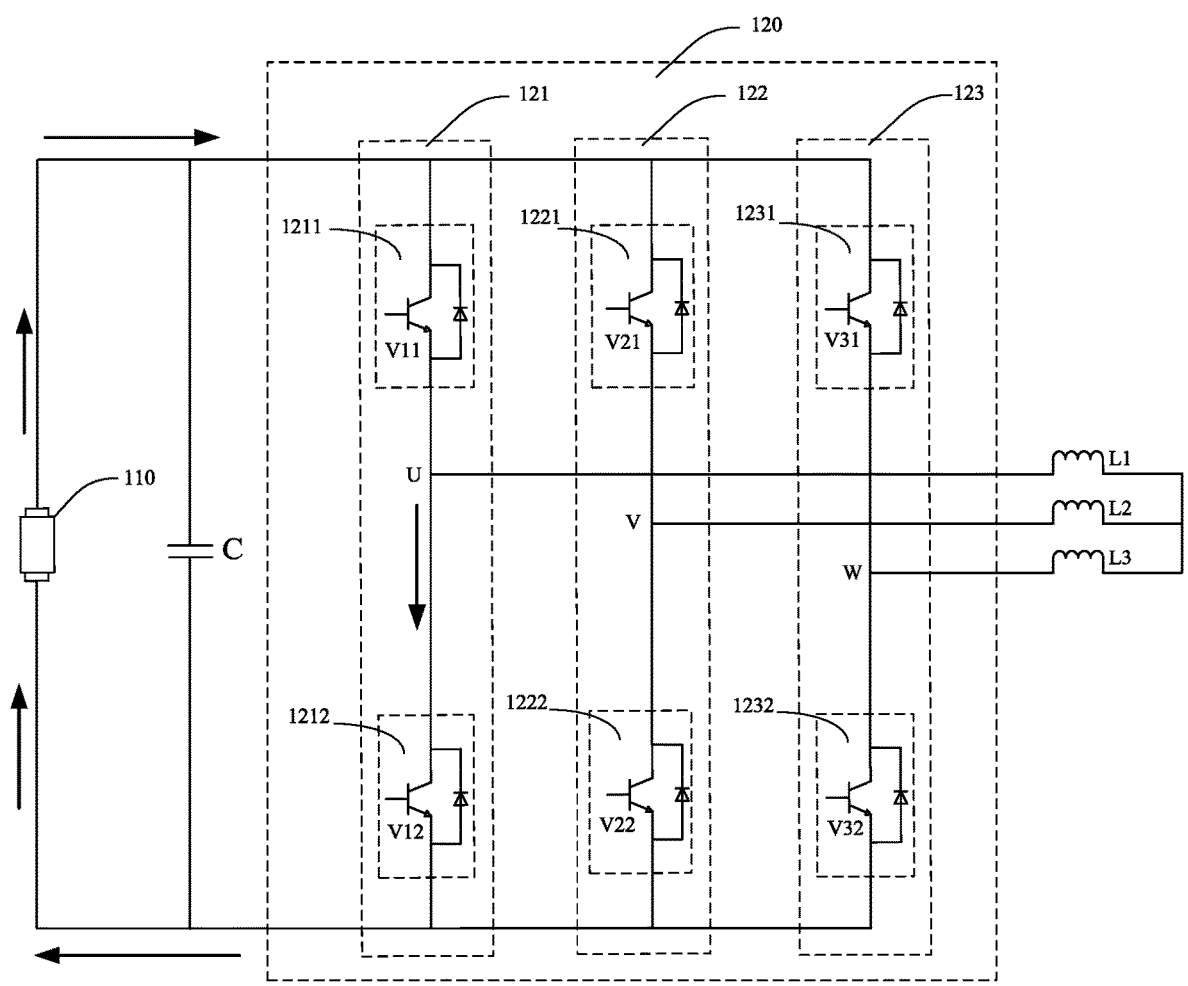
FIG. 5 is a schematic diagram of a short-circuit loop formed in the method shown in FIG. 3.

For example, as shown in FIG. 5, the control circuit 130 can control the leg 121 in the switch circuit 120 to turn on, that is, control a switch V11 and a switch V12 on the leg 121 to be closed, thus forming the short-circuit loop including the traction battery 110, the switch V11, and the switch V12.

Figure 6:
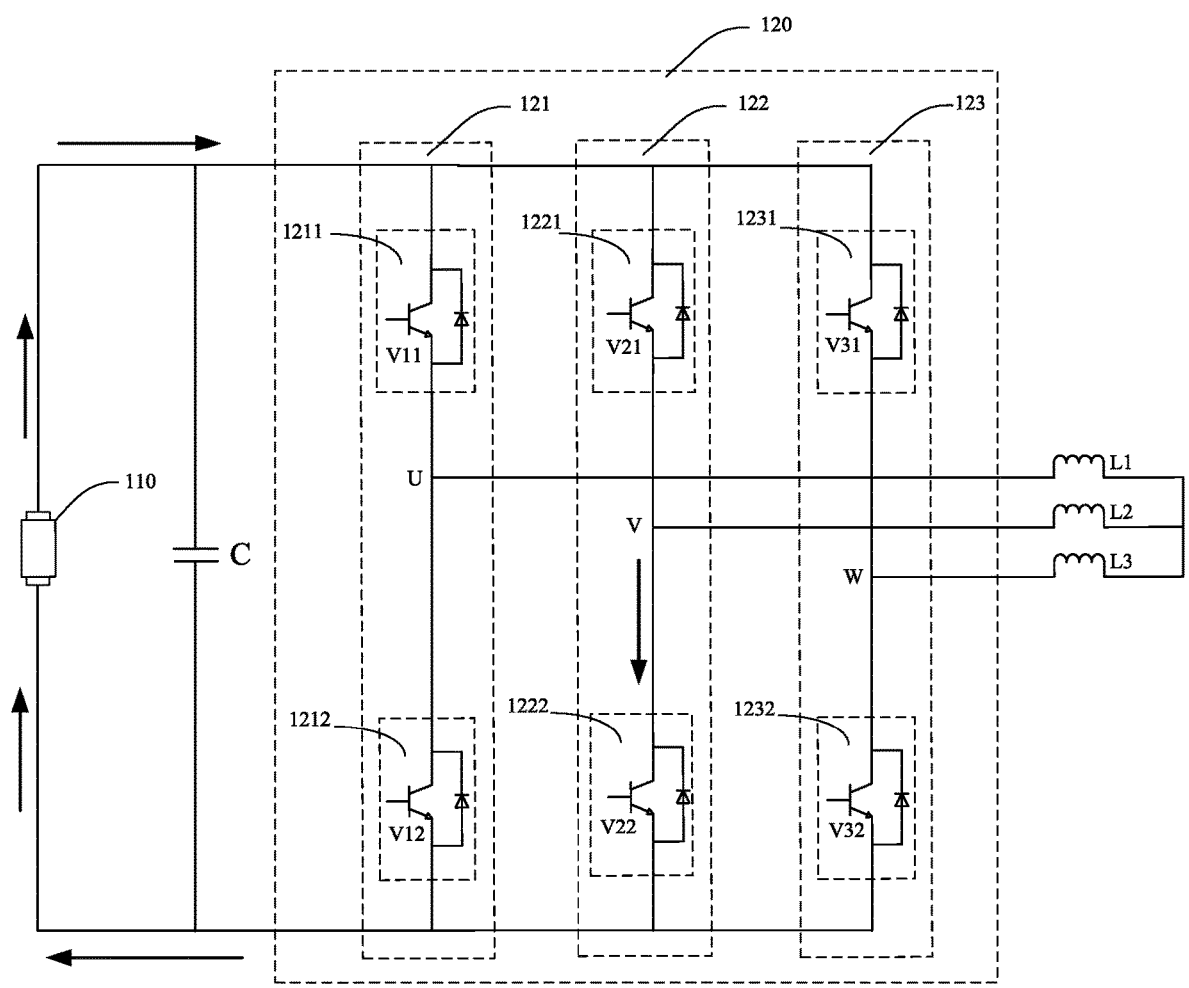
FIG. 6 is a schematic diagram of a short-circuit loop formed in the method shown in FIG. 3.

For another example, as shown in FIG. 6, the control circuit 130 can control the leg 122 in the switch circuit 120 to turn on, that is, control a switch V21 and a switch V22 on the leg 122 to be closed, thus forming the short-circuit loop including the traction battery 110, the switch V21, and the switch V22.

Figure 7:
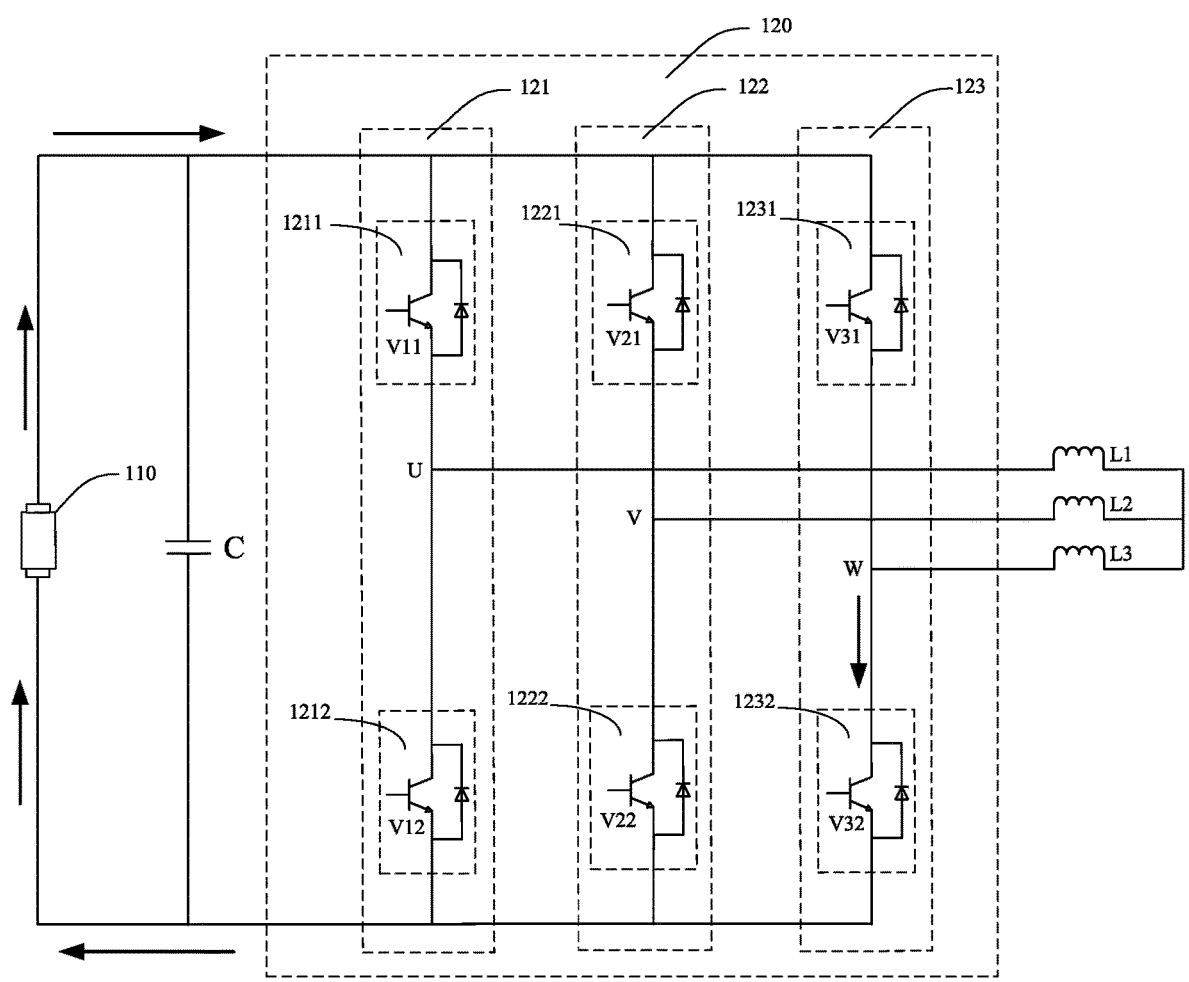
FIG. 7 is a schematic diagram of a short-circuit loop formed in the method shown in FIG. 3.

For another example, as shown in FIG. 7, the control circuit 130 can control the leg 123 in the switch circuit 120 to turn on, that is, control a switch V31 and a switch V32 on the leg 123 to be closed, thus forming the short-circuit loop including the traction battery 110, the switch V31, and the switch V32.

Figure 8:
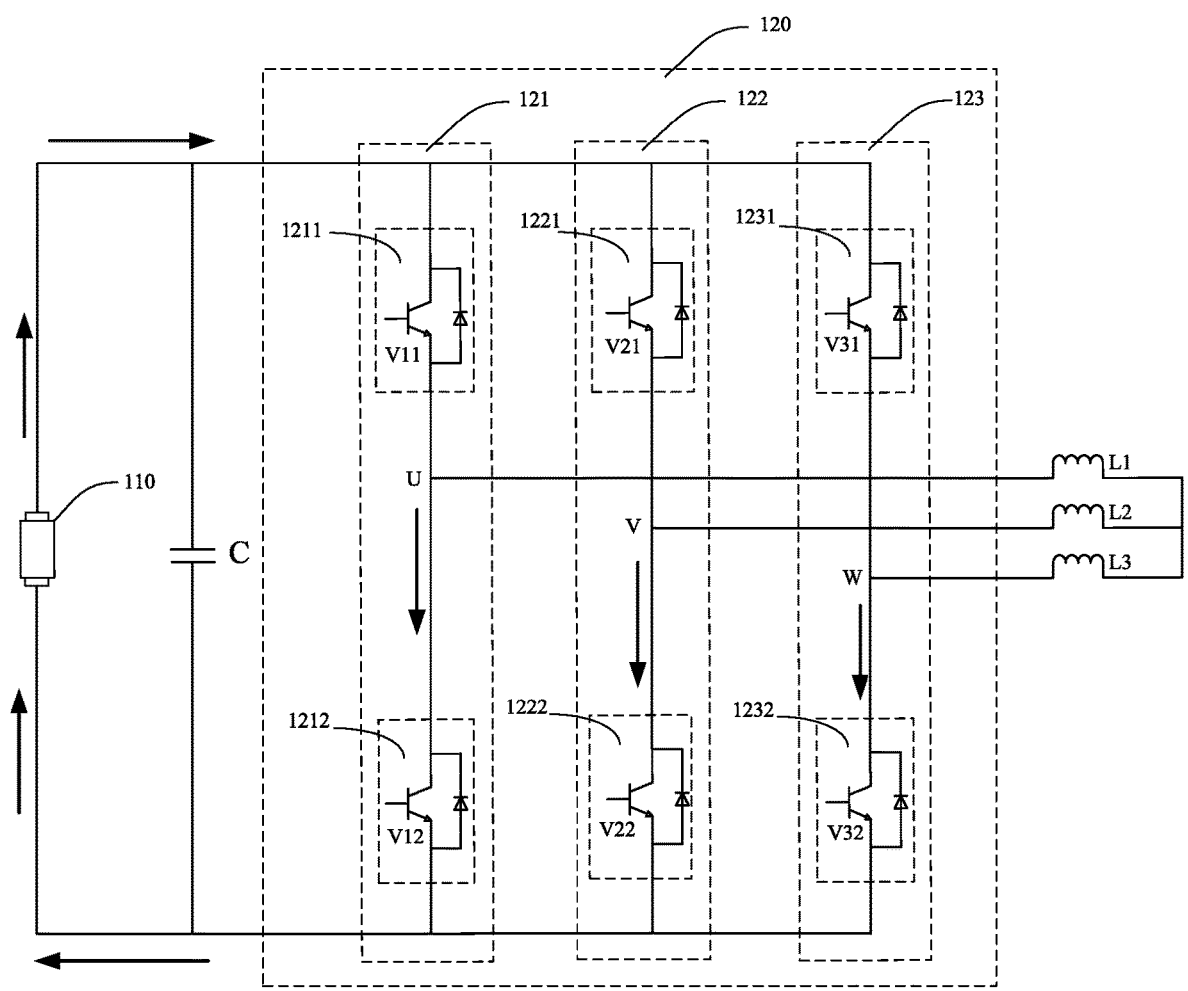
FIG. 8 is a schematic diagram of a short-circuit loop formed in the method shown in FIG. 3.

For an example, as shown in FIG. 8, the control circuit 130 can control the leg 121, the leg 122, and the leg 123 in the switch circuit 120 to turn on simultaneously, that is, control the switch V11, the switch V12, the switch V21, the switch V22, the switch V31, and the switch V32 to be closed, thus forming three short-circuit loops: a short-circuit loop including the traction battery 110, the switch V11, and the switch V12; a short-circuit loop including the traction battery 110, the switch V21, and the switch V22; and a short-circuit loop including the traction battery 110, the switch V31, and the switch V32.

In an implementation, the short-circuit loop includes some or all legs of the motor 140, and the number of the legs included in the short-circuit loop may be determined depending on a heating requirement of the traction battery 110, such as a desired temperature or heating speed. For example, if the current temperature of the traction battery 110 is not quite low and the battery can operate normally with only a slight rise in temperature, some legs can be controlled to form a short-circuit loop, thus reducing the power output by the traction battery 110 for heating; and if the current battery temperature is quite low, all legs need to be controlled to form a short-circuit loop, thus improving the heating efficiency to raise the temperature of the traction battery 110 as soon as possible.

It can be seen that the short-circuit loop can be controlled to turn on or turn off more conveniently by controlling the on/off of the legs in the switch circuit 120 without adding extra devices, thus avoiding extra costs.

In another implementation, a second switch 125 is disposed between the traction battery 110 and at least one leg in the switch circuit 120. In this case, step 250 performed by the control circuit 130 may further include: controlling, based on the on duty cycle, the second switch 125 to turn on. The second switch 125 may be, for example, a primary positive switch or primary negative switch in the entire vehicle system, and is connected to the positive terminal or negative terminal of the traction battery 110.

Figure 9:
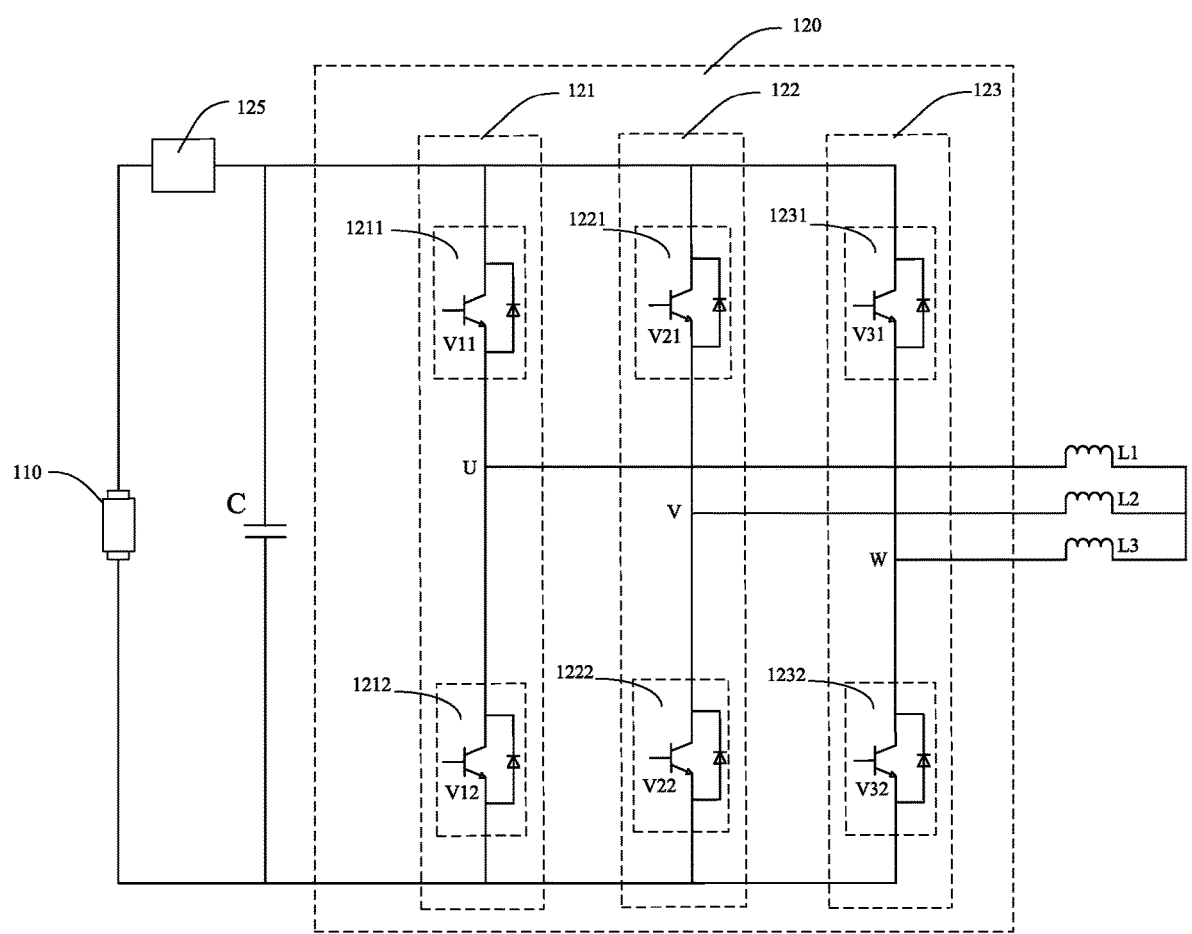
FIG. 9 is a schematic diagram of a circuit structure of the battery heating system shown in FIG. 1.

For example, as shown in FIG. 9, the second switch 125 is the primary positive switch or primary negative switch in the entire vehicle system and located between the traction battery 110 and the switch circuit 120. It is assumed that three short-circuit loops need to be formed for heating the traction battery 110, the control circuit 130 only needs to control the second switch 125 to be closed. Similarly, when the three short-circuit loops need to be turned off, the control circuit 130 only needs to control the second switch 125 to turn off. In this way, it is unnecessary to simultaneously turn on or turn off the switch V11, the switch V12, the switch V21, the switch V22, the switch V31, and the switch V32 in the legs. Although the extra second switch 125 is added, the control circuit 130 can control the on/off of the short-circuit loop simply by controlling the on/off of the second switch 125 without controlling each leg in the switch circuit 120, thus reducing the complexity of the control circuit 130.

In an implementation, the foregoing method 200 performed by the control circuit 130 may further include: obtaining an internal resistance R of the traction battery 110; determining an on frequency f of the short-circuit loop based on the internal resistance R of the traction battery 110; and controlling, based on the on frequency f, the short-circuit loop to turn on.

A smaller internal resistance R of the traction battery 110 leads to a higher on frequency f. As shown in FIG. 4, f=1/T.

It is assumed that at a low frequency, a relationship between the current I of the traction battery 110 and the voltage U of the traction battery 110 is as follows:

$$\begin{cases} I = U/R & 0 < t \leq D/f \\ I = 0 & D/f < t \leq 1/f \end{cases},$$

At a high frequency, a relationship between the current I of the traction battery 110 and the voltage U of the traction battery 110 is as follows:

$$\begin{cases} I = \dfrac{U}{R} - \dfrac{L}{R} \cdot \dfrac{dI}{dt} & 0 < t \leq D/f \\ I = 0 & D/f < t \leq 1/f \end{cases},$$

where D represents the duty cycle, and f represents the on frequency of the short-circuit loop.

When I=0, the foregoing formula can be solved to obtain:

$$\begin{cases} I = (U/R) \cdot [1 - \exp(-(R/L) \cdot t)] & 0 < t \le D/f \\ I = 0 & D/f < t \le 1/f \end{cases}.$$

As f increases, the variable t approximates 0, and the foregoing equation can be equated as:

$$\begin{cases} I = (U/L) \cdot t & 0 < t \le D/f \\ I = 0 & D/f < t \le 1/f \end{cases},$$

where L represents a parasitic capacitance of the switch.

In this way, in a heating cycle, the valid value of the current I can be approximately:

$$I \approx \frac{U}{2 \; fL/D^2},$$

where $2/fL/D^2$ can be defined as the equivalent external resistance during heating at a high frequency, that is, the boundary condition of a model for the traction battery 110 during heating at a high frequency.

It can be seen that increasing the frequency f can decrease the current I in the short-circuit loop.

Figure 10:
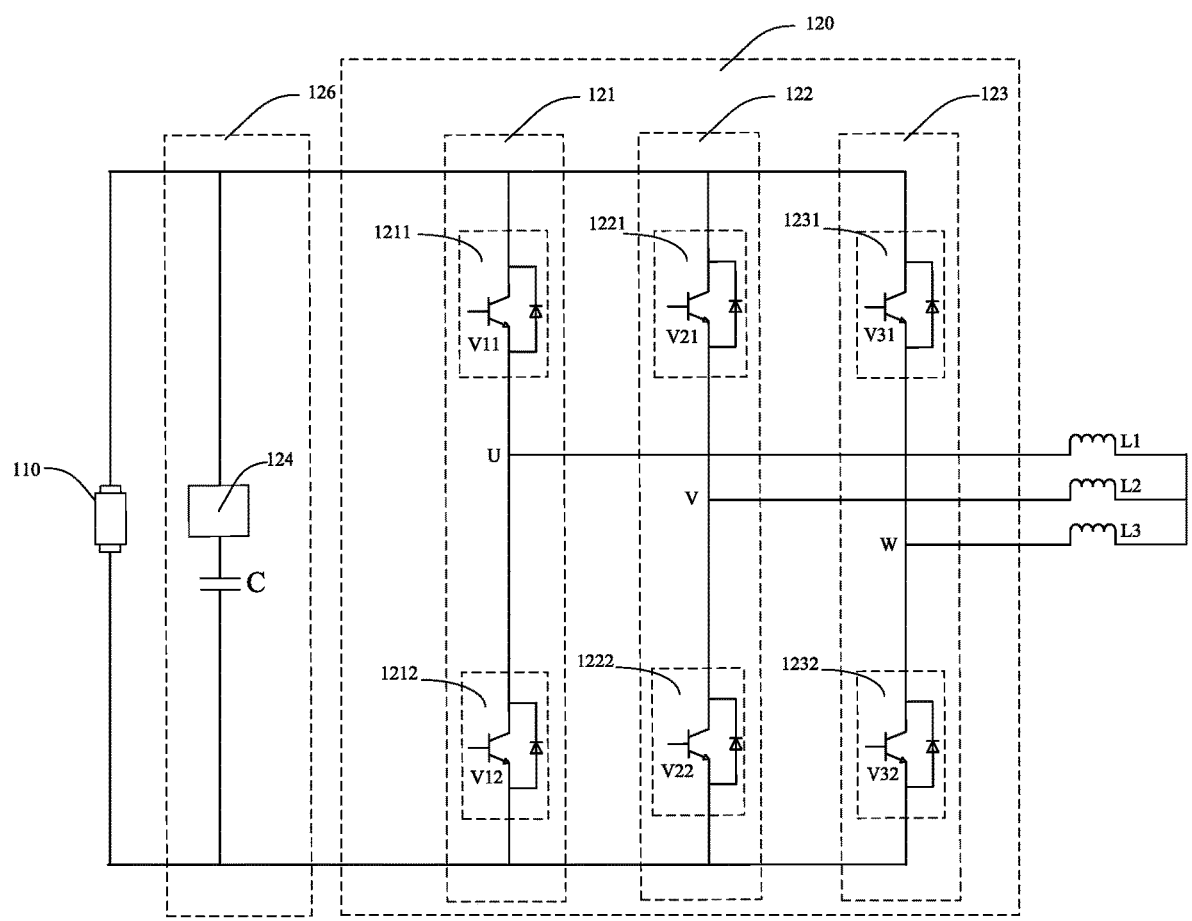
FIG. 10 is a schematic diagram of a circuit structure of the battery heating system shown in FIG. 1.

In an implementation, as shown in FIG. 10, the traction battery 110 is further connected to a capacitor branch 126 in parallel, the capacitor branch 126 includes a capacitor C and a first switch 124 connected in series, and the method further includes: before controlling the short-circuit loop to turn on, controlling the first switch 124 to turn off.

The capacitor C typically provides voltage regulation and is configured to regulate voltage across two terminals of the traction battery 110, and therefore is also called a voltage regulator capacitor. When the short-circuit loop is formed, the capacitor C can share a part of the current I, thus reducing the heating efficiency. A first switch 124 is disposed at a branch where the capacitor C is located and controlled to turn off during heating, which can prevent the impact of the capacitor C on the traction battery 110 during heating, thus improving the heating efficiency.

Figure 11A:
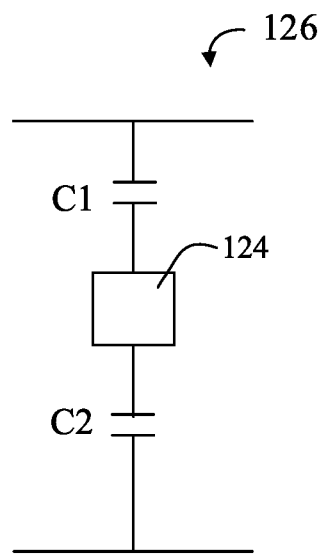
FIG. 11 is a schematic diagram of a capacitor branch in a switch circuit disclosed in an embodiment of this application.
Figure 11B:
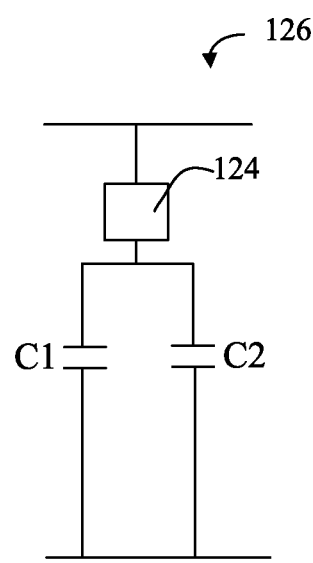

In FIG. 10, the capacitor C and the first switch 124 are connected in series. In the practical application, when there are multiple voltage regulator capacitors, other connection relationships may be also present between the multiple capacitors and the first switch 124, for example, the position of the first switch 124 when a capacitor C1 and a capacitor C2 are connected in series or in parallel shown in FIGS. 11A and 11B.

It should be understood that a smaller internal resistance R of the traction battery 110 leads to a faster increase of the current I in the short-circuit loop. For example, for a liquid state battery, the current I in the short-circuit loop can rapidly increase to more than 7000 A within 0.5 ms. To prevent a large current from damaging the traction battery 110, a switching device needs to perform switching at a higher frequency, so as to control the turn-on/off time of the short-circuit loop, thus avoiding damage to the traction battery 110 during heating and ensuring the safety during the heating.

The type of the traction battery 110 is not limited in the embodiments of this application. However, when the internal resistance R is excessively small, the current I in the short-circuit loop quickly increases to a large value, which imposes higher requirements on the tolerance level of the switching device. Therefore, in some implementations, the traction battery 110 may be a solid-state battery or a traction battery with an internal resistance greater than a preset value. The preset value can be determined based on the tolerance level of the switching device, thus ensuring that the switching frequency of the switching device is within its tolerance range, avoiding a large current I in the short-circuit loop causing safety problems.

Figure 12:
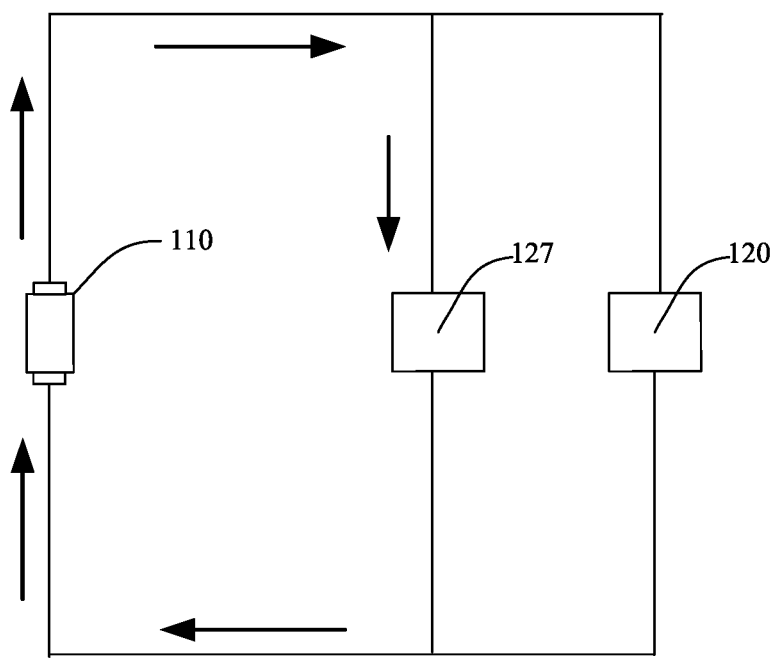
FIG. 12 is a schematic diagram of another circuit structure of the battery heating system shown in FIG. 1.

An embodiment of this application further provides a heating manner. To be specific, a third switch 127 is connected in parallel between two terminals of the traction battery 110. As shown in FIG. 12, when the traction battery 110 is heated, the third switch 127 can be closed, thus forming a short-circuit loop including the traction battery 110 and the third switch 127.

In an implementation, the method 200 performed by the control circuit 130 may further include: receiving a heating stop signal sent by the BMS of the traction battery 110; and controlling, according to the heating stop signal, the short-circuit loop to turn off, so as to stop heating the traction battery 110.

Figure 13:
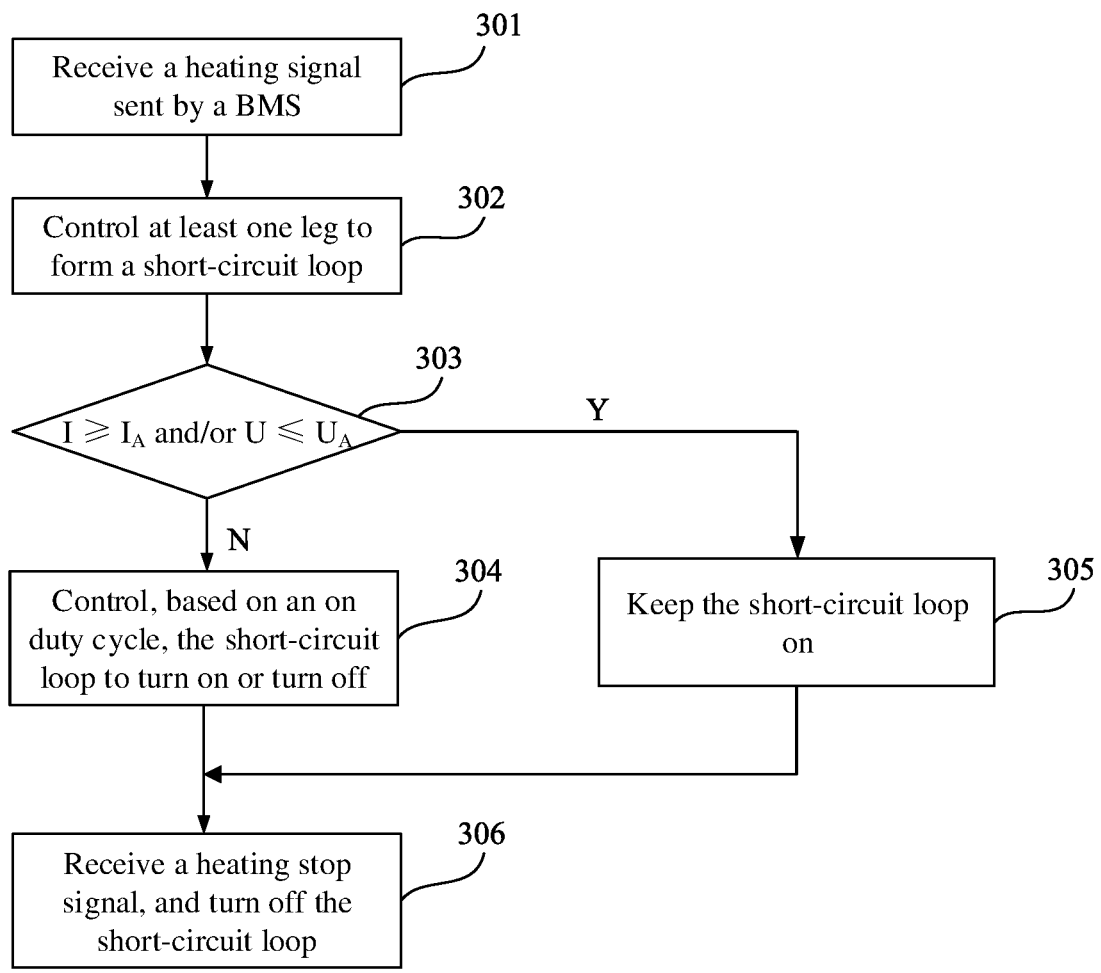
FIG. 13 is a flowchart of a possible specific implementation of the method shown in FIG. 3.

FIG. 13 illustrates a possible specific implementation of the method 200. As shown in FIG. 13, the method specifically includes some or all of the following steps.

Step 301: Receive a heating signal sent by a BMS.

Step 302: Control, according to the heating signal, at least one leg to form a short-circuit loop of a traction battery 110.

Step 303: Determine whether a current I in the short-circuit loop exceeds an allowable discharge current IA of the traction battery 110, and/or a voltage U is less than a minimum discharge voltage $U_A$.

If I≥$I_A$ and/or U≤$U_A$, step 304 is performed; if I<$I_A$ and/or U>$U_A$, step 305 is performed.

Step 304: Control, based on an on duty cycle, the short-circuit loop to turn on or turn off.

Step 305: Keep the short-circuit loop on.

Step 306: Receive a heating stop signal sent by the BMS, and turn off the short-circuit loop according to the heating stop signal.

It should be understood that step 303 needs to be performed periodically, that is, a relationship between currents I and $I_A$ and/or a relationship between voltages U and $U_A$ needs to be periodically determined, so as to ensure the safety during heating.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A heating method of traction battery, wherein the traction battery is connected to a switch circuit of a motor and configured to supply power to the motor via the switch circuit, the switch circuit comprises multiple legs, and the multiple legs are connected to the traction battery in parallel, the method comprising:

receiving a heating signal sent by a battery management system of the traction battery;

controlling, according to the heating signal, at least one of the multiple legs to form a short-circuit loop of the traction battery, the short-circuit loop being configured to discharge the traction battery and heat the traction battery during the discharging process;

obtaining the internal resistance of the traction battery;

determining an on frequency of the short-circuit loop based on the internal resistance of the traction battery, wherein a smaller internal resistance of the traction battery leads to a higher on frequency; and controlling, based on the on frequency, the short-circuit loop to turn on.

2. The heating method according to claim 1, further comprising:

obtaining current passing through the traction battery and/or voltage of the traction battery;

determining an on duty cycle of the short-circuit loop based on the current passing through the traction battery and/or the voltage of the traction battery; and controlling, based on the on duty cycle, the short-circuit loop to turn on, such that the current in the short-circuit loop does not exceed allowable discharge current of the traction battery, and/or the voltage of the traction battery is not lower than minimum discharge voltage of the traction battery.

3. The heating method according to claim 2, wherein obtaining current in the short-circuit loop comprises:

detecting the current in the short-circuit loop via a current sensor disposed in the short-circuit loop; and/or determining the current in the short-circuit loop based on the voltage of the traction battery and internal resistance of the traction battery.

4. The heating method according to claim 2, wherein controlling, based on the on duty cycle, the short-circuit loop to turn on comprises:

controlling, based on the on duty cycle, the at least one leg to turn on.

5. The heating method according to claim 2, wherein a switch is disposed between the traction battery and the at least one leg, and controlling, based on the on duty cycle, the short-circuit loop to turn on comprises:

controlling, based on the on duty cycle, the switch to turn on.

6. The heating method according to claim 2, wherein the traction battery is further connected to a capacitor branch in parallel, and the capacitor branch comprises a capacitor and a switch connected in series, the method further comprising:

before controlling the short-circuit loop to turn on, controlling the switch to turn off.

7. The heating method according to claim 1, wherein each of the at least one leg comprises a first switching device and a second switching device connected in series, and a joint between the first switching device and second switching device of each of the at least one leg is connected to at least one winding of the motor in one-to-one correspondence.

8. The heating method according to claim 1, further comprising:

receiving a heating stop signal sent by the battery management system; and controlling, according to the heating stop signal, the short-circuit loop to turn off, so as to stop heating the traction battery.

9. The heating method according to claim 1, wherein the traction battery is a solid-state battery, and/or the internal resistance of the traction battery is greater than a preset value.

10. A heating system of traction battery, comprising:

a traction battery;

a switch circuit disposed between the traction battery and a motor and configured for the traction battery to supply power to the motor, wherein the switch circuit comprises multiple legs, and the multiple legs are connected to the traction battery in parallel; and a control circuit configured to:

receive a heating signal sent by a battery management system of the traction battery;

control, according to the heating signal, at least one of the multiple legs to form a short-circuit loop of the traction battery, the short-circuit loop being configured to discharge the traction battery and heat the traction battery during the discharging process;

obtain the internal resistance of the traction battery;

determine an on frequency of the short-circuit loop based on the internal resistance of the traction battery, wherein a smaller internal resistance of the traction battery leads to a higher on frequency; and control, based on the on frequency, the short-circuit loop to turn on.

11. The heating system according to claim 10, wherein the control circuit is further configured to:

obtain current passing through the traction battery and/or voltage of the traction battery;

determine an on duty cycle of the short-circuit loop based on the current passing through the traction battery and/or the voltage of the traction battery; and control, based on the on duty cycle, the short-circuit loop to turn on, such that the current in the short-circuit loop does not exceed allowable discharge current of the traction battery, and/or the voltage of the traction battery is not lower than minimum discharge voltage of the traction battery.

12. The heating system according to claim 11, wherein the control circuit is specifically configured to:

detect the current in the short-circuit loop via a current sensor disposed in the short-circuit loop; and/or determine the current in the short-circuit loop based on the voltage of the traction battery and internal resistance of the traction battery.

13. The heating system according to claim 11, characterized in that the control circuit is specifically configured to:

control, based on the on duty cycle, the at least one leg to turn on.

14. The heating system according to claim 11, wherein a switch is disposed between the traction battery and the at least one leg, and the control circuit is specifically configured to:

control, based on the on duty cycle, the switch to turn on.

15. The heating system according to claim 11, wherein the traction battery is further connected to a capacitor branch in parallel, the capacitor branch comprises a capacitor and a switch connected in series, and the control circuit is further configured to:

before controlling the short-circuit loop to turn on, control the switch to turn off.

16. The heating system according to claim 10, wherein each of the at least one leg comprises a first switching device and a second switching device connected in series, and a joint between the first switching device and second switching device of each of the at least one leg is connected to at least one winding of the motor in one-to-one correspondence.

17. The heating system according to claim 10, wherein the control circuit is further configured to:
 receive a heating stop signal sent by the battery management system; and
 control, according to the heating stop signal, the short-circuit loop to turn off, so as to stop heating the traction battery.

18. The heating system according to claim 10, wherein the traction battery is a solid-state battery, and/or the internal resistance of the traction battery is greater than a preset value.

* * * * *